Jan. 30, 1934. F. W. JACKMAN 1,945,193
COMPOSITE PICTURE
Filed May 4, 1931 2 Sheets-Sheet 2

INVENTOR.
FRED W. JACKMAN
BY W E Beatty
ATTORNEYS.

Patented Jan. 30, 1934

1,945,193

UNITED STATES PATENT OFFICE 1,945,193

COMPOSITE PICTURE

Fred W. Jackman, Beverly Hills, Calif., assignor to Warner Bros. Pictures, Inc., New York, N. Y., a corporation of Delaware Application May 4, 1931. Serial No. 535,062

4 Claims. (Cl. 88—16)

The invention relates to composite pictures wherein a plurality of components, such as action and background components, respectively, are combined to make a composite picture.

In the application, Serial No. 370,297, filed June 12, 1929, jointly by myself and H. F. Koenekamp, there is described a method of making composite pictures in a single photographic step or exposure, by using a positive film or transparency dye-toned a single elementary color, carrying a background picture, the action being photographed through the transparency onto a panchromatic film. In this case the action is illuminated with light of substantially the same color as the transparency and is photographed before a background colored substantially complementary to the color of the transparency, whereby the picture carried by the transparency is printed onto the panchromatic negative film by means of the light coming from the background, at the same time that the image of the action is photographed through the transparency onto the panchromatic film.

An object of the present invention is to avoid the use in the camera of the positive film or transparency just described.

This is accomplished by providing the negative film stock itself with an impregnation corresponding to one of the components of the composite picture. In this case the impregnation is of a selected color corresponding to the color employed to illuminate the action. Light from the action passes through this impregnation substantially unimpeded, whereby the action leaves its own image on the negative film substantially free from any representation of the background image therein, while the background image is printed onto the remainder of the negative film from the light of the complementary color from the ground and which is not intercepted by the action.

Figure 1:
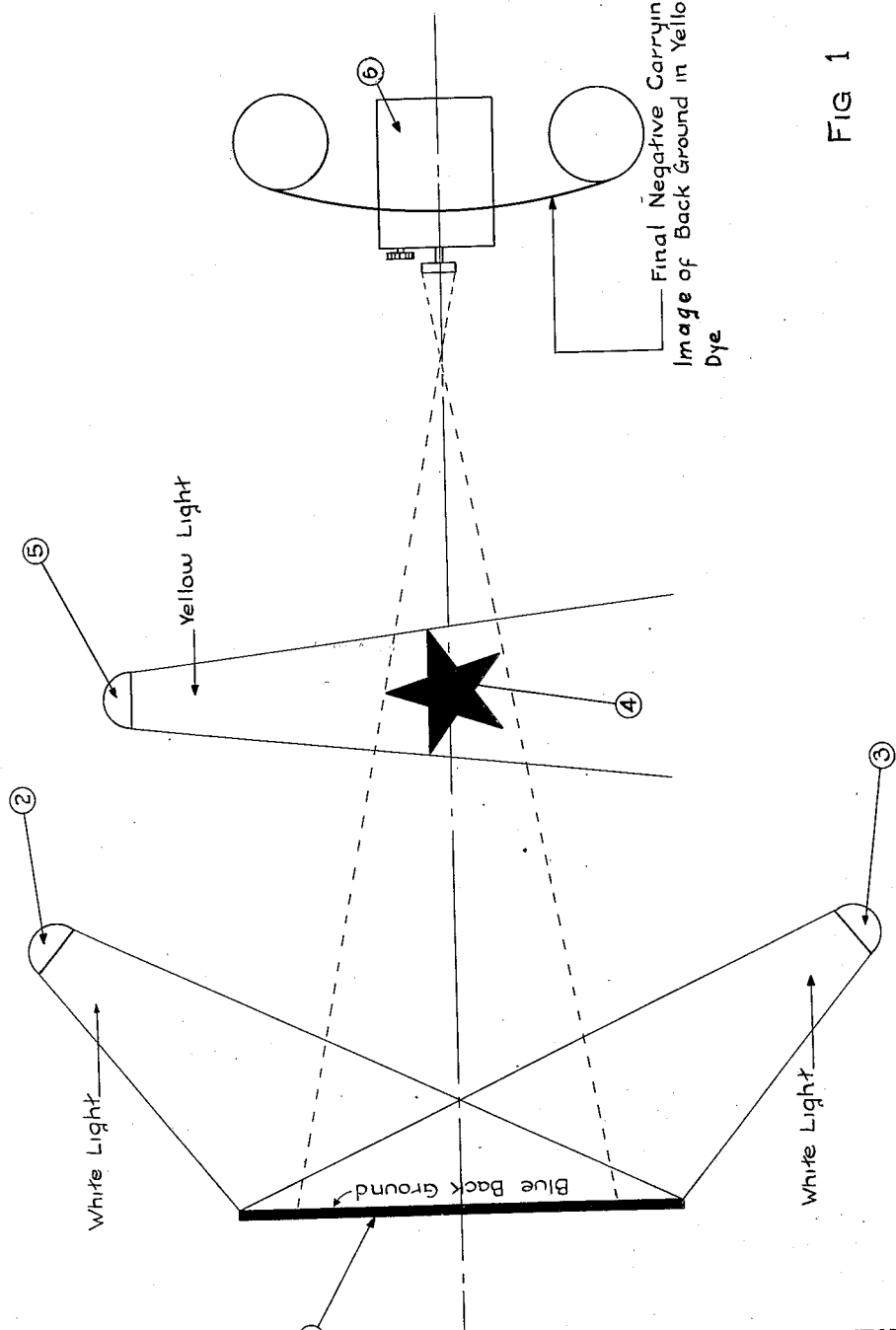
Figure 2:
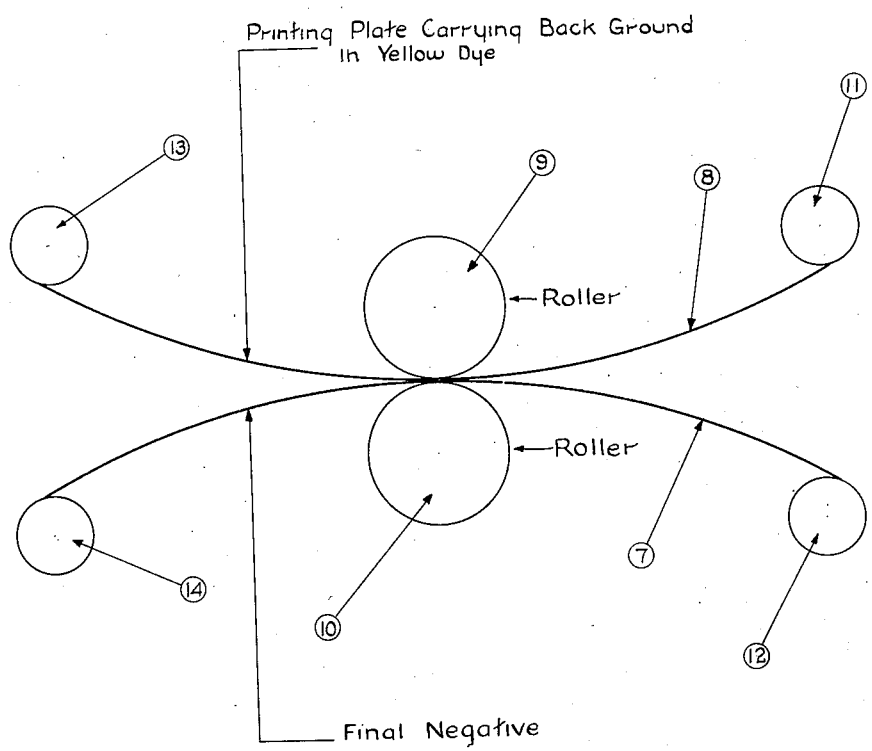

For further details of the invention, reference may be made to the drawings, in which Fig. 1 illustrates diagrammatically an arrangement for photographing composite pictures without using the usual transparency in the camera, and Fig. 2 illustrates a contact printer for transferring the background impression in dye from a positive film to the final negative.

Referring to Fig. 1, the plain background 1 may be of ultramarine color and illuminated with white light from the sources 2 and 3. Positioned about 15 ft. in front of the background 1 is the action 4 illuminated with yellow light from the source 5. A camera 6 photographs the action 4 before the background 1 and it is provided with negative stock or film carrying the image of the background scene in yellow dye. The manner in which the negative film is prepared will now be described.

I first make a positive print of the desired background scene. This positive print, after various washings in water, is treated with a suitable mordant such as copper sulphate, sodium chloride, potassium bichromate and sulphuric acid dissolved in water. After the the positive film is mordanted, it is dyed, for example, with an aqueous solution of Tartrazine, which is an acid dye having no special affinity for gelatin. Of course, the picture part is the only part of the image which is mordanted, and the mordant restores the dye only where the image is mordanted. Tartrazine is a yellow dye complementary in color to the color of the background 1. The dyed image thus prepared on the positive film is transferred to and impregnated in the actinic coating on the final negative by bringing this positive film (i. e., printing plate or matrix) into contact with the sensitive emulsion on the final negative. This contact printing may be accomplished by the means shown in Fig. 2, wherein 7 represents the final negative and 8 the printing plate carrying the background image in yellow dye. The image on the film 8 is transferred to the emulsion side of the film 7 by pressing these films together by suitable means, such as rollers 9 and 10. These films are supplied by reels 11 and 12, respectively, and are taken up by reels 13 and 14, respectively.

I find, for example, that the speed of the rollers 9 and 10 should hold the films 7 and 8 in contact for about one-half minute and the drying process for the impregnated negative film takes about one minute in a drying chamber. This results in the heavily dyed part of film 8 causing impregnation throughout the whole depth of the negative film, while the lighter dyed parts of film 8 impregnate the negative emulsion to a lesser degree.

While I have referred to the use of blue and yellow lights in combination with a yellow image on the printing plate, it will be apparent that other colors may be used instead.

A very important development made possible by this method is the fact that a "printing plate" can be made from the composite so produced and then another composite can be produced, using said composite as one component of a new composite. This is not commercially possible in ordinary photograhy, as the photographic quality is seriously impaired with each duplication, principally due to the excessive accumulation of grain. Since certain processes such as above described, for making "printing plates", include removing silver, the trouble with grain does not become a factor; hence, it is possible to include as many components as may be required in the final composite picture and still retain a high degree of photographic quality.

As above described, the dye is soluble in water and it will, therefore, be removed in the rinse tank in the ordinary course of developing the exposed negative film.

It will be apparent to those skilled in the art that the invention is capable of many modifications within the scope of the appended claims. For example, I may transfer the dye to the base or support of the negative film, instead of to the emulsion side, in which case I would expose through the celluloid side of the negative.

I claim:

1. The method of making composite pictures in a single exposure which comprises impregnating a film having an actinic coating with an impression in a selected color of one component and exposing said film to another component before a ground, said impression and the illumination of said other component being substantially the same color and substantially complementary to the color of said ground.

2. The method of making composite motion pictures in a single exposure without the use in a camera of a dye-toned positive film or transparency before a negative film, which comprises impregnating a film having an actinic coating with an impression in a selected color of a background scene before which a foreground scene is to be depicted, and exposing said film to said foreground scene before a ground, said impression of the background scene and the illumination of said foreground scene being substantially the same color and substantially complementary to the color of said ground.

3. The method of making composite motion pictures of a desired background and foreground, which comprises preparing a printing plate carrying an adherent coating of a selected color of one component of the composite picture, impressing said printing plate against an unexposed film to transfer said component thereto and exposing said film to another component of said picture while said other component is illuminated with light of said color before a ground illuminated with light of a substantially complementary color, whereby said background and foreground are photographed on said film in a single exposure.

4. The method of making composite motion pictures of a desired background and action, which comprises preparing a printing plate carrying an image in yellow dye of said background, impressing said printing plate against an unexposed film to transfer and affix said yellow dye image to said film and exposing said film to said action while illuminated with yellow light before a ground illuminated with blue light whereby said background and action are photographed on said film in substantially mutually exclusive areas and in a single exposure.

FRED W. JACKMAN.